(12) United States Patent
Zhou et al.

(10) Patent No.: US 7,941,146 B2
(45) Date of Patent: May 10, 2011

(54) METHOD AND APPARATUS FOR HANDLING DTMF REQUESTS WHEN INTER-SWITCH HANDOVER IS INVOLVED

(75) Inventors: Eric Zhou, QingDao (CN); Oliver Chen, QingDao (CN); Andrew Huang, QingDao (CN); Jennifer He, QingDao (CN); Seaman Chen, QingDao (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 996 days.

(21) Appl. No.: 11/651,520

(22) Filed: Jan. 10, 2007

(65) Prior Publication Data

US 2007/0254660 A1    Nov. 1, 2007

(30) Foreign Application Priority Data

Apr. 29, 2006   (CN) .......................... 2006 1 0151398

(51) Int. Cl.
*H04Q 7/20*   (2006.01)
(52) U.S. Cl. ...................... 455/436; 455/432.1; 455/403; 455/435; 455/564; 379/90.01; 379/67.1; 379/201.02; 379/283

(58) Field of Classification Search .......... 455/436–439, 455/564, 403, 423, 432–435; 379/59–63, 379/361, 165, 90–93, 207.02, 283
See application file for complete search history.

(56) References Cited

U.S. PATENT DOCUMENTS

| | | | | |
|---|---|---|---|---|
| 5,140,627 A * | 8/1992 | Dahlin | .......................... | 455/436 |
| 5,835,574 A * | 11/1998 | Lam | ........................ | 379/90.01 |
| 6,151,514 A * | 11/2000 | Cheng et al. | .................. | 455/564 |
| 6,285,880 B1 * | 9/2001 | Gagnon et al. | ............. | 455/432.1 |
| 6,574,323 B1 * | 6/2003 | Manuel et al. | ........... | 379/207.02 |
| 6,693,994 B1 * | 2/2004 | Stern | ............................ | 379/67.1 |
| 7,630,488 B2 * | 12/2009 | Picha | ............................ | 379/283 |
| 2003/0137952 A1 * | 7/2003 | Menon | .......................... | 370/328 |

* cited by examiner

*Primary Examiner* — Anthony S Addy
*Assistant Examiner* — Michael T Vu
(74) *Attorney, Agent, or Firm* — Harness, Dickey & Pierce (57) ABSTRACT

In an embodiment of the method for handling subscriber input during interswitch handover of a call from a first switching station to a second switching station, DTMF digits received at the second switching station are sent in a message to the first switching station. The first switching station then performs an operation on the received digits such as playing the DTMF tones to a network or triggering a service.

12 Claims, 6 Drawing Sheets

FIG. 4B ically slowly over limited geographic areas. For example, a PCS system is intended to provide wireless service within business complexes, large buildings, commercial parks, city business districts, universities and the like, where a user may walk or otherwise move slowly in a limited area. Because a PCS system is specifically designed for low mobility applications, the system does not require the extensive and expensive infrastructure of a wireless telecommunication system.

METHOD AND APPARATUS FOR HANDLING DTMF REQUESTS WHEN INTER-SWITCH HANDOVER IS INVOLVED

PRIORITY STATEMENT

This application claims the priority of Chinese Patent Application No. 200610151398.4, filed on Apr. 29, 2006, in the State Intellectual Property Office of the People's Republic of China, the disclosure of which is incorporated herein in its entirety by reference.

BACKGROUND OF THE INVENTION

A personal communication service (PCS) system is an example of a wireless communication system. A PCS system is intended to provide wireless service for low mobility applications, where users move relatively slowly over limited geographic areas. For example, a PCS system is intended to provide wireless service within business complexes, large buildings, commercial parks, city business districts, universities and the like, where a user may walk or otherwise move slowly in a limited area. Because a PCS system is specifically designed for low mobility applications, the system does not require the extensive and expensive infrastructure of a wireless telecommunication system.

Figure 1:
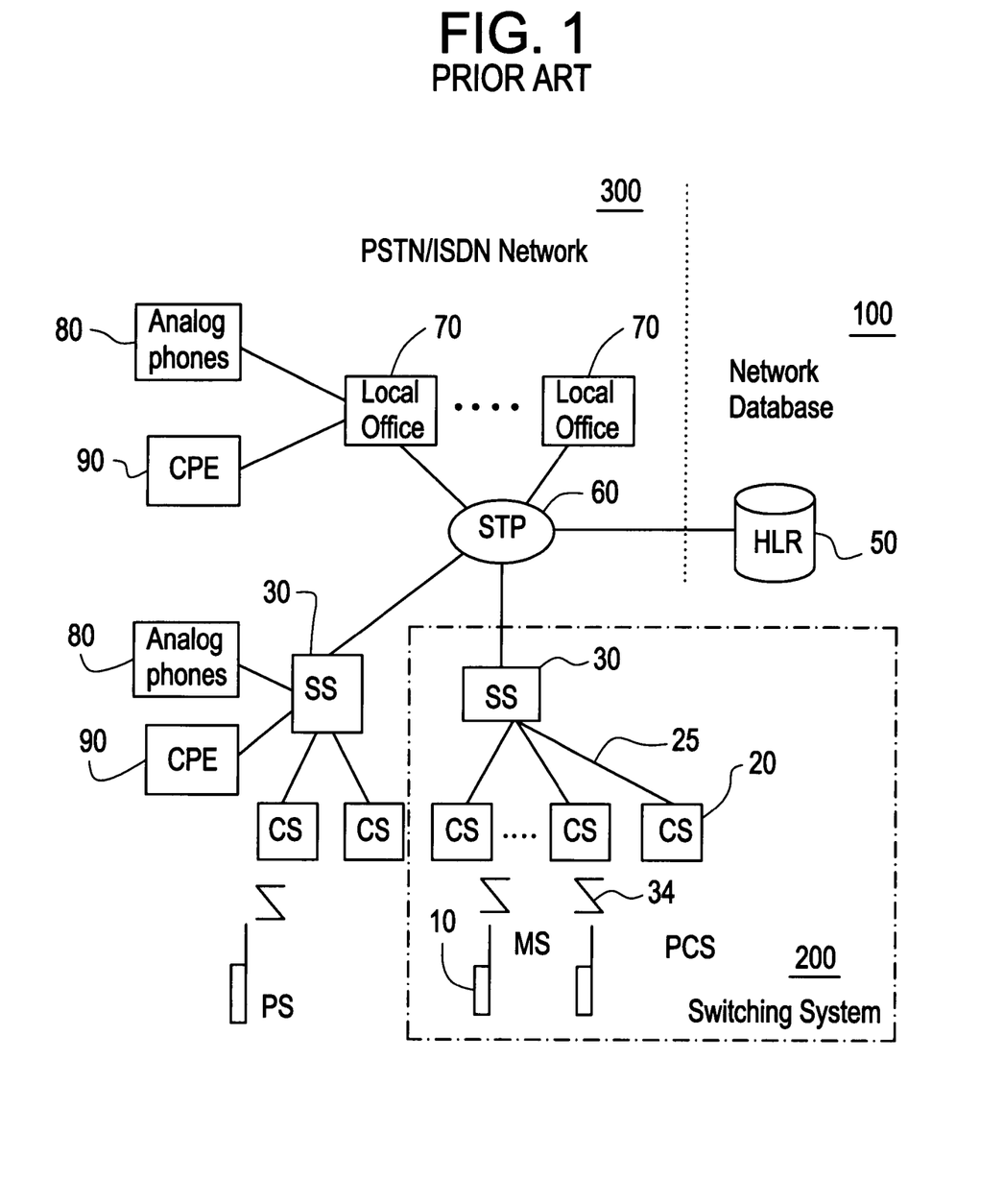
FIG. 1 illustrates a telecommunication network of the prior art.

A PCS system may be a part of a telecommunication network as illustrated in FIG. 1.

A PCS system or network of the prior art includes a network database 100, PCS switching systems 200, and a switched telephone network 300, for example, a public switched telephone network (PSTN) or an Integrated Signaling Digital Network (ISDN).

The network database 100 includes a Home Location Register (HLR) 50, which contains wireless subscribers' profile information. Subscribers' profile information includes information such as address, account status, preferences, etc. Each PCS switching system 200 includes a PCS switching center or station 30, and a plurality of radio port control units (RPCU), also known as cell stations 20. Each cell station 20 is connected to a switching station 30 via, for example, a basic rate interface (BRI) line 25. A signal protocol between the switching station 30 and the cell station 20 may be the Q.931 signaling protocol. Each of the cell stations 20 controls a radio port having a radio transmitter/receiver to communicate with mobile stations 10 located in a geographic service area served by that cell station 20. Several cell stations 20 may be arranged such that their service areas are contiguous and provide an extended range of service beyond the geographic area served by a single cell station 20.

The network database 100 is connected to the switching stations 30 via a switching transfer point (STP) 60. The STP 60 is responsible for signal transfer between a switching station 30 and local offices 70, or among different switching stations 30. The local office 70 may further be connected to analog lines 80 and customer premise equipment (CPE) 90 as shown in FIG. 1.

A switching station 30 may be a conjoining point of the PSTN/ISDN network 300 and the PCS switching system 200. Accordingly, a switching station 30 may also serve as a wireless switch and serve a plurality of subscribers, including the analog lines 80 and CPE 90, similar to a local office 70 as shown in FIG. 1.

The cell stations 20 serving contiguous geographic areas may be connected either to the same switching station 30 or to different switching stations 30. When a mobile station 10 moves between areas served by cell stations 20 on the same switching station 30, the transfer of service from a current cell station 20 to a new cell station 20 is known as an intraswitch handover or an intraswitch automatic link transfer (ALT). When the mobile station 10 moves between geographic areas served by cell stations 20 hosted by different switching stations 30, the transfer of service from the current cell station 20 to the new cell station 20 is known as an interswitch handover or an interswitch ALT.

If a user makes/receives a call via a first switching station 30 and then is handed over (interswitch) to a second switching station 30, the second switching station 30 begins handling dual tone multi-frequency (DTMF) requests. Also the first switching station 30 stores the call-related information (e.g., call forward, call hold, etc.), which is unknown to the first switching station 30. Accordingly, this type of interswitch procedure may introduce errors when handling DTMF requests as will be discussed in more detail below with respect to FIGS. 2a-2c.

Figure 2A:
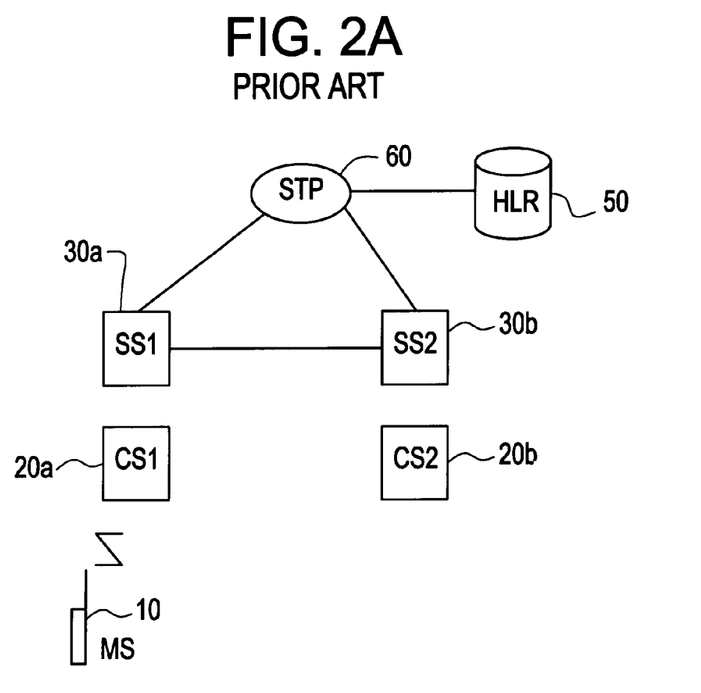
Figure 2B:
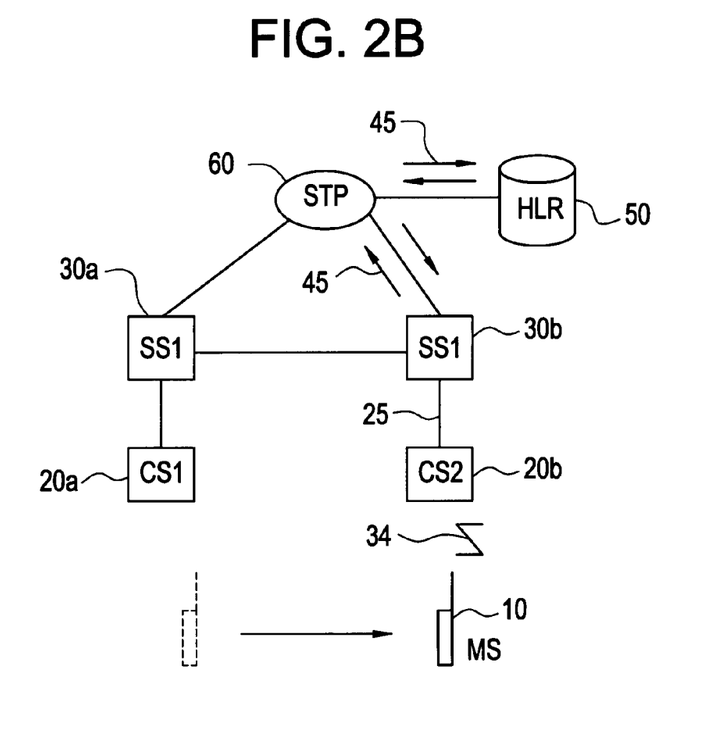

FIGS. 2a-2c illustrates an interswitch handover in a PCS system of the prior art.

Referring to FIG. 2a, a mobile station 10 continuously monitors signals when the mobile station 10 is in a first cell station 20a of a first switching station 30a. If the signal from the first cell station 20a falls below a certain threshold, the mobile station 10 transmits a handover request message through an air interface protocol 34 to a second cell station 20b of a second switching station 30b (assuming that the second switching station 30b is transmitting a stronger signal than the first switching station 30a) as shown in FIG. 2b.

The second cell station 20b sends a handover request message to the second switching station 30b via the BRI line 25. When the second switching station 30b receives the handover request message, the second switching station 30b stores information about the second cell station 20b, and then queries 45 a home location register (HLR) 50 for information on the first switching station 30a via the STP 60. Using this information, call setup message 36 is sent from the second switching station 30b to the first switching station 30a to request a voice path switch as shown in FIG. 2c. The first switching station 30a sends an acknowledge message 37 to the second switching station 30b, and performs a voice path switch operation to the second switching station 30b. In the prior art, the first switching station 30a is only responsible for the voice path switch operation during the interswitch handover.

The prior art provides no measures for the following scenarios. Referring again to FIG. 2c, during an interswitch handover, but before the second switching station 30b receives an acknowledge message 37 from the first switching station 30a, a mobile station 10 may send DTMF requests via the air interface protocol 34 through the second cell station 20b to the second switching station 30b. However, the second cell station 20b will ignore the DTMF requests because a voice path has not been fully connected, which may cause certain DTMF digits to be missing during the interswitch handover. For example, a user calls a Private Branch Exchange (PBX) number, and hears an announcement prompting to enter an extension number, such as "12345". However, if a call of the mobile station 10 is handed over while the user starts to enter the extension number, the user may enter "12" while in the first switching station 30a and enter "345" while in the second switching station 30b. Because the second switching station 30b ignores DTMF requests during an interswitch handover, the digits received by the PBX switch is "12" and the user (mobile station) will either be connected to an extension "12" or get a vacant number announcement.

Figure 2D:
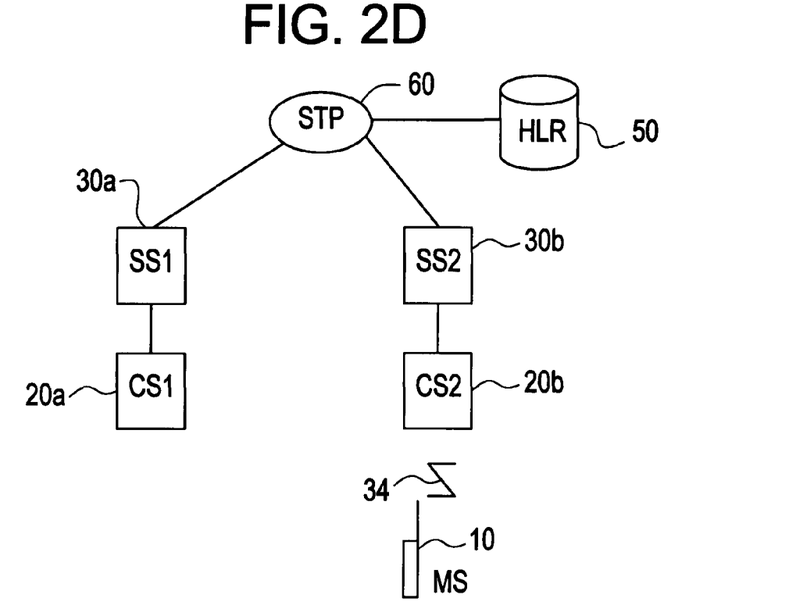

Referring to FIG. 2d, after an interswitch handover, a mobile station 10 may send DTMF requests via the air interface protocol 34 through the second cell station 20b to the second switching station 30b for supplementary services, for example, a conference call, a call transfer, a call hold, etc. For example, the dialed digits "*69" may represent the trigger for a call back service. The second switching station 30b may receive the "*69" trigger, but because the second switching station 30b has no call-related information with respect to the supplementary services of the mobile station 10, the second switching station 30b will treat the DTMF requests as playing tones only towards the network. The mobile station 10, therefore, may lose such services after an interswitch handover.

SUMMARY OF THE INVENTION

In an embodiment of the method for handling subscriber input during interswitch handover of a call from a first switching station to a second switching station, DTMF digits received at the second switching station are sent in a message to the first switching station. The first switching station then performs an operation on the received digits such as playing the DTMF tones to a network or triggering a service.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limiting of the example embodiments of the present invention.

FIGS. 2a-2d illustrate handover methods in a personal communication service system of the prior art.

DETAILED DESCRIPTION OF THE EXAMPLE EMBODIMENTS

Although example embodiments of the present invention will be described with reference to a personal communication service system, a person of ordinary skill will recognize the methods of the present invention may apply to other telecommunication systems.

Figure 3A:
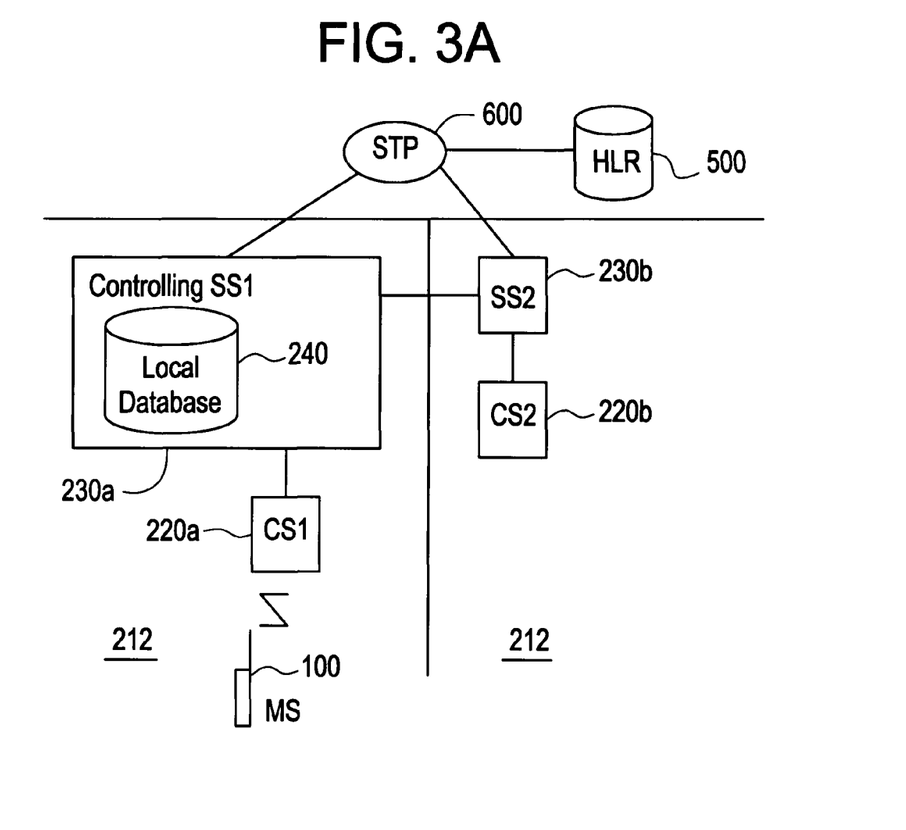
FIGS. 3a-3c illustrate a handover method in a personal communication service system according to an example embodiment of the present invention.
Figure 3B:
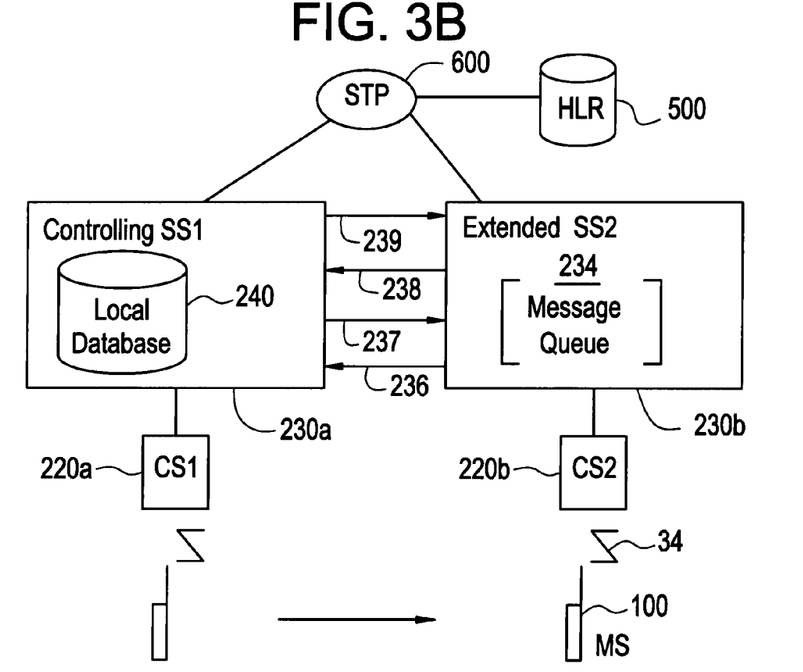
Figure 3C:
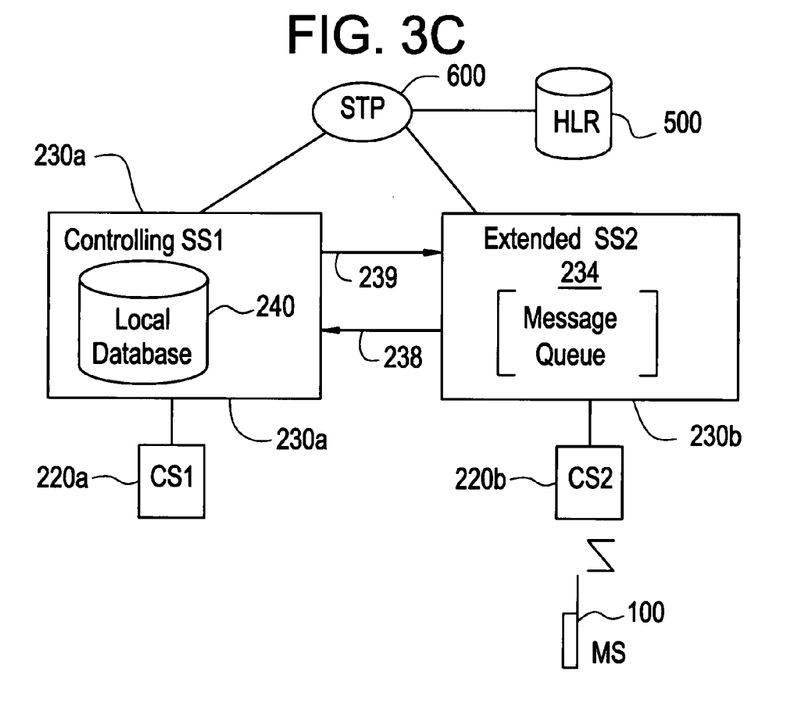

FIGS. 3a-3c illustrate a handover method in a personal communication service (PCS) system according to an example embodiment of the present invention. The architecture of this embodiment is substantially the same as the PCS system architecture shown in FIG. 1. Accordingly, a description of this architecture will not be repeated in detail, and elements in FIG. 1 missing from FIGS. 3a-3c have not been shown for the sake of clarity. However, because of the operational differences, and some architectural differences as described in detail below, different reference numerals have been used for the elements illustrated in FIGS. 3a-3c.

Namely, FIG. 3a shows a home location register 500 and PCS switching systems 212 connected to a switching transfer point (STP) 600. Each PCS switching system 212 includes a switching station 230 connected to the STP 600 and connected to one or more cell stations 220. As further shown, each switching station 230 may include a local database 240. The operation of the switching station 230 and the local database 240 will now be described in more detail below. More specifically, an example of a handover or handoff from one switching station 230 to another switching station 230 will be described. In the example of FIGS. 3a-3c, the handing off PCS switching system has an "a" appended to the reference numerals, and the handed to PCS switching system has a "b" appended to the reference numerals. Also, the handing off switching station 230a will be referred to as the first or controlling switching station, and the handed to switching station 230b will be referred to as the second or extended switching station.

When a call originates towards or from a first switching station 230a, call-related information may be maintained in local database 240 of the first switching station 230a and remains therein for the duration of the call. The call-related information stored in the local database 240 may include data concerning subscription status of supplementary services (e.g., call waiting, call hold, etc.), and auxiliary call information of the supplementary services (such as, on-hold party identifier, status of a conference log (active, isolate, float, etc.), current conference size, etc. The call related information may be received from the home location register (HLR) 500.

Referring to FIG. 3b, when a mobile station 100 moves from a first cell station 220a to a second cell station 220b, the mobile station 100 sends an interswitch handover request to the second cell station 220b. The second cell station 220b sends the interswitch handover request to the second switching station 230b. In response, the second switching station 230b sets up message queue 234 to store DTMF request messages received from the mobile station 100. The second switching station 230b sends a path switch operation request 236 to the first switching station 230a. The first switching station 230a sends a first acknowledge message 237 to the second switching station 230b in response to the path switching request if the request is accepted. After a successful path switch operation by the first switching station 230a, the second switching station 230b checks the message queue 234. If there are any DTMF requests, those requests will be processed and the DTMF digits in those requests will be included in a call progress (CPG) message 238 of, for example, a Common Channel Signaling System 7 (CCS7), sent from the second switching station 230b to the first switching station 230a. The CPG message 238, in addition to the DTMF digits, may carry a coded unique tag, which may be a first byte of a digit subfield. In addition, a guard timer in the second switching station 230b may be started for the delivery of the CPG message 238. The purpose of the guard timer will be describes in more detail below.

After the first switching station 230a receives the CPG message 238, the local database 240 containing call related information is checked. Depending on any digits dialed before the path switch and on the content of the CPG message 236, tones can be played to the network or a service selected. Playing tones and selecting a service will be described in more detail below.

After the service is selected or tones are played, the first switching station 230a may send a second acknowledge message 239 carrying the unique tag with no DTMF digits to the second switching station 230b. Based on the second acknowledge message 239, the message queue 234 on the second switching station 230b may be released. Even if the second acknowledge message 239 is not received by the second switching station 230b, the message queue 234 may be released if the guard timer expires.

Referring to FIG. 3c, if the second switching station 230b receives DTMF requests after an interswitch handover, the second switching station 230b may include the DTMF digits in another CPG message 238 and send the CPG message 238 to the first switching station 230a. After the first switching station 230a receives the CPG message 238, the local database 240 containing call related information will be checked. Depending on the DTMF request, tones will be played to the network or a service will be selected.

After the service is selected or tones are played, the first switching station 230a may send a second acknowledge message 239 carrying the unique tag with no DTMF digits to the second switching station 230b. Based on the second acknowledge message 239, the message queue 234 on the second switching station 230b may released. Even if the second acknowledge message 239 is not received by the second switching station 230b, the message queue 234 may be released if the guard timer expires.

For example, during an interswitch handover, but before a second switching station 230b receives the first acknowledge message 237 from the first switching station 230a, a mobile station 100 may send DTMF requests through a second cell station 220b to a second switching station 230b. As stated above, the second switching station 230b sets-up a message queue 234 to store DTMF requests such as or including DTMF digits. Therefore, if the mobile station 100 calls a Private Branch Exchange (PBX) number, and hears an announcement prompting to enter an extension number, such as "1, 2, 3, 4, 5," and if a call of the mobile station 100 is handed over while a user starts to enter the extension number, the user may enter "1, 2" while connected with the first switching station 230a and enter "3, 4, 5" while connected with the second switching station 230b. The DTMF digits "3, 4, 5" will be stored in the message queue 2,3,4 by the second switching station 230b. After a successful path switch, the second switching station 230b checks the message queue 234 for DTMF requests. Because the message queue 2,3,4 include DTMF digits, the second switching station 230b sends a call progress message 238 to the first switching station 230a, including the DTMF digits "3, 4, 5." The first switching station 230a receives the call progress message 238, and the tones related to "3, 4, 5" are played to the network, thus completing entry of the extension number.

The above example assumed a situation in which the local database 240 would have already been checked for service triggers. Accordingly, a service trigger example will now be provided.

In this example, assume a user of the mobile station 100 wants to enter "*69," but the call of the mobile station 100 is handed over such that the user enters "*6" while connected with the first switching station 230a and enters "9" while connected with the second switching station 230b. Also assume that "*69," is the trigger for a service, such as, call forwarding.

The first switching station 230a having received digits "*6" recognizes that the digits are the beginning of a trigger for a service because the digits match the beginning of a service trigger stored in the database 240. But the digits "*6" are insufficient to trigger a service so the first switching station 230a waits to receives the missing digit. After a successful path switch, the second switching station 230b checks the message queue 234 for DTMF requests. The second switching station 230b sends a call progress message 238 to the first switching station 230a, including the DTMF digit "9." When the first receiving station 230a receives the missing digit, i.e., "9," the first switching station 230a combines the digits, and checks the combined digits "*69" against the local database 240. Thereafter, the service associated with this trigger is performed by the first switching station 230a.

Figure 4A:
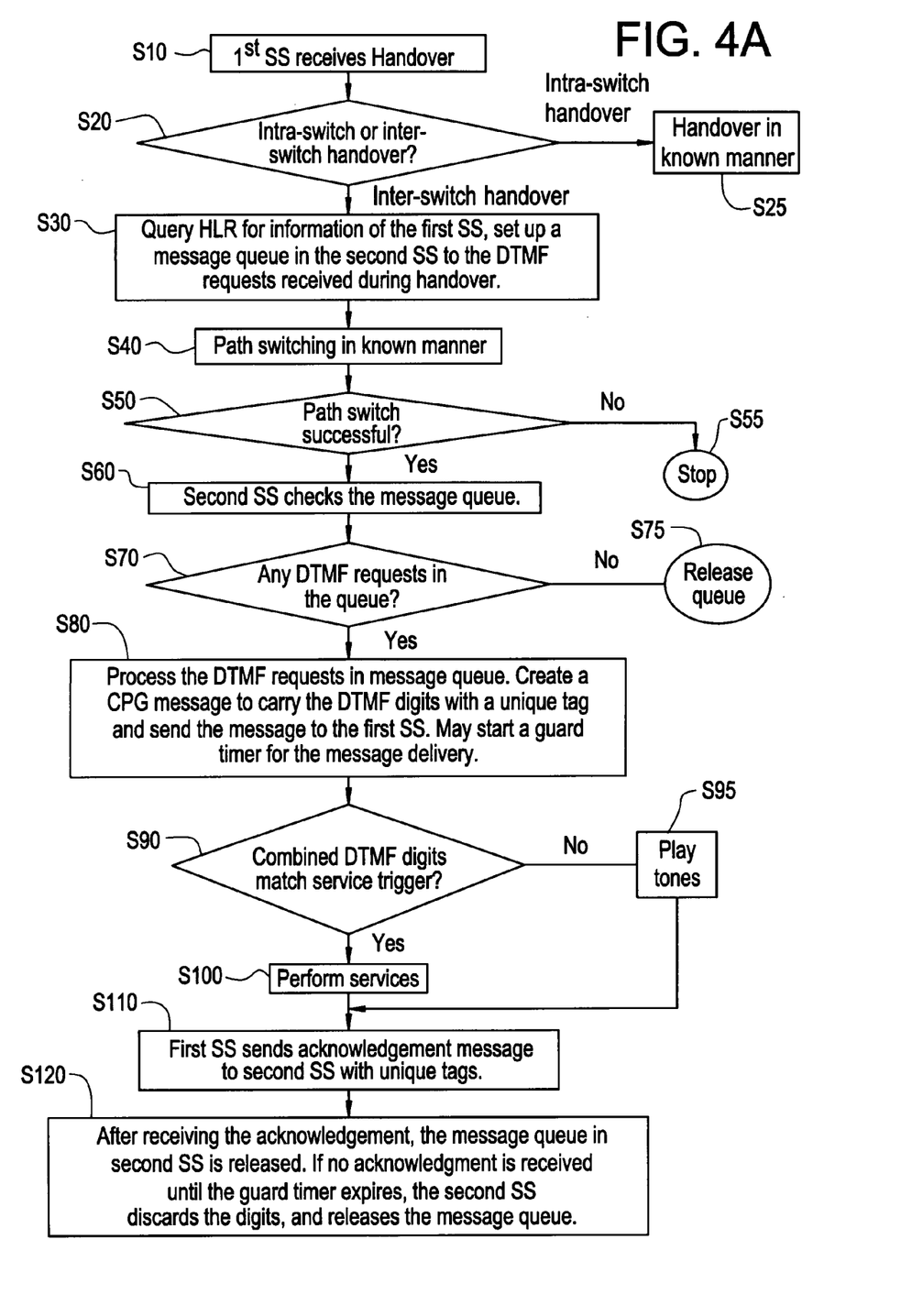
FIGS. 4a-4b illustrate a flow chart of a handover method according to example embodiments of the present invention.

FIG. 4a is a flow chart illustrating a method of interswitching handover according to an example embodiment of the present invention in greater detail. For purpose of example only, this method will be described as being implemented by the architecture of FIGS. 3a-3c.

As shown, at step S10, a mobile station 100 in a first cell station 220a under the control of a first switching station (controlling) 230a sends a handover request to a second switching station 230b (extended) when the mobile station 100 leaves an area serviced by the first cell station 220a and enters an area served by the second cell station 220b. The second switching station 230b determines whether the handover request is an interswitch request or an intraswitch request in step S20.

If the requested handover is an intraswitch request, the handover is processed in a conventionally known manner in step S25. If the requested handover is an interswitch request, the second switching station 230b queries the Home Location Register (HLR) 500 for information on the first switching station 230a, and also sets up a message queue 234 to store any DTMF requests received during the handover request in step S30.

The first switching station 230a sends a first acknowledge message 237 and also performs a voice path switch operation in a conventionally known manner in step S40.

At step S50, the second switching station 230b determines whether the voice path switching was successful. If the voice path switching was not successful, then the process stops at step S55. If the voice path switch operation was successful, the second switching station 230b checks the message queue 234 at step S60 for any DTMF requests.

At step S70, the second switching station 230b determines whether there are DTMF requests in the message queue 234. If there are no DTMF requests, the message queue 234 on the second switching station 230b is released in step S75. If there is a DTMF request, the second switching station 230b processes the DTMF request and creates a CPG message 238 to carry DTMF digits to the first switching station 230a in step S80. The CPG message 238, in addition to the DTMF digits, may carry a coded unique tag, which may be a first byte of a digit subfield. The CPG message 238 is then sent to the first switching station 230a. For example, the CPG message 238 may be sent via the STP 600 or an interface between the switching stations 230. In addition, a guard timer in the second switching station 230b may be started for the delivery of the CPG message 238.

After the first switching station 230a receives the CPG message 238, the DTMF digits may be combined with DTMF digits previously received by the first switching station 230a. For example, if the first switching station 230a received digits matching the start of a trigger in the database 240, then the first switching station 230a holds these digits waiting to receive completion of the trigger. Accordingly, when the DTMF digits are received second switching station 230b, the first switching station 230a combines the held digits with the received digits to obtain combined DTMF digits. Alternatively, if the first switching station 230a received digits that did not form the start of a trigger, then those digits would have been played to the network. Accordingly, the combined DTMF digits will only included the DTMF digits received from the second switching station 230b. Similarly, if the first switching station 230a did not receive DTMF digits during the handover, the combined DTMF digits will only included the DTMF digits received from the second switching station 230b. The combined DTMF digits are checked against the local database 240 to determine whether the combined DTMF digits trigger a service in step S90. If no service is triggered, tones may be played to the network in step S95. If the combined DTMF digits trigger a service, the service is performed in step S100 by the first switching station 203a.

After the appropriate service is performed or tones are played, the first switching station 230a may send a second acknowledge message 239 carrying the unique tag with no DTMF digits to the second switching station 230b in step S110. Based on the second acknowledge message 239, the message queue 234 on the second switching station 230b may be released in step S110. Even if the second acknowledge message 239 is not received by the second switching station 230b, the message queue 234 may be released if the guard timer expires.

Figure 4B:
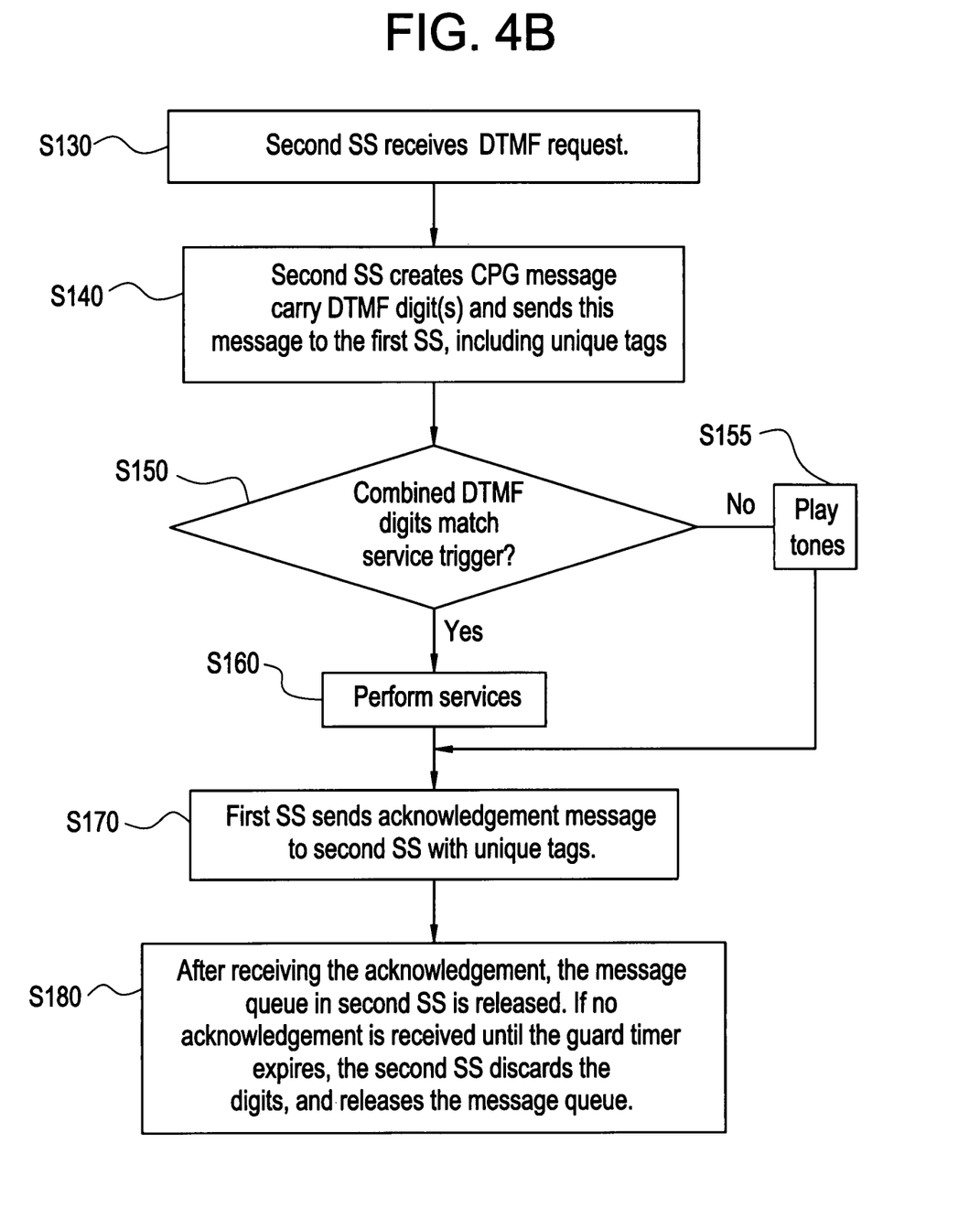

FIG. 4b illustrates another example embodiment of the present invention, wherein DTMF digits are received by the second switching station 230b after the voice path switch operation. In this example embodiment, the embodiment of FIG. 4a may have been already performed as disclosed above.

In this embodiment, at step S130, the second switching station 230b receives a DTMF request. The second switching station 230b processes the DTMF request, and creates a CPG message 238 to carry DTMF digits to the first switching station 230a in step S140. The CPG message 238, in addition to the DTMF digits, may carry a coded unique tag, which may be a first byte of a digit subfield. The CPG message 238 is then sent to the first switching station 230a. In addition, a guard timer in the second switching station 230b may be started for the delivery of the CPG message 238.

After the first switching station 230a receives the CPG message 238, the first switching station 230a checks the local database 240 to determine whether the DTMF digits trigger a service in step S150. If no service is triggered, tones may be played to the network in step S155. If a service is triggered, the appropriate service is performed in step S160 by the first switching station 230a. The first switching station 230a may send a second acknowledge message 239 carrying the unique tag with no DTMF digits to the second switching station 220b in step S170. Based on the acknowledge message 239, the message queue 234 at the second switching station 230b may be released in step S180. Even if the second acknowledge message 239 is not received by the second switching station 230b, the message queue 234 may be released if the guard timer expires.

Example embodiments of the present invention disclose a method of handling dual tone multi-frequency (DTMF) requests during a handover. Example embodiments of the present invention provide measures of preventing lost of tones and services during an interswitch handover.

The invention being thus described, it will be obvious that the same may be varied in many ways. For example, while an example implementation of the present invention has been described with respect to a personal communication system, it will be appreciated that the present invention is applicable to other telecommunication systems. Such variations are not to be regarded as a departure from the invention, and all such modifications are intended to be included within the scope of the invention.

What is claimed is:

1. A method for handling input during interswitch handover of a call from a first switching station to a second switching station, the method comprising:
   receiving a message at the first switching station from the second switching station, the message including dual-tone multi-frequency (DTMF) digits received by the second switching station from a subscriber mobile station;
   combining the DTMF digits with DTMF digits previously received from the subscriber mobile station at the first switching station;
   comparing the combined DTMF digits to service triggers in a database; and
   performing an operation on the DTMF digits associated with at least one of the compared service triggers.

2. The method of claim 1, wherein the performing step plays tones to a network based on the DTMF digits.

3. The method of claim 1, further comprising:
   sending an acknowledgment message including a unique tag, which was included in the received message, in response to receiving the received message.

4. The method of claim 1, wherein the DTMF digits received by the second switching station are directly received from the subscriber mobile station.

5. The method of claim 1, wherein the DTMF digits received by the second switching station from the subscriber mobile station are at least a portion of a service trigger.

6. A method for handling input during a interswitch handover of a call from a first switching station to a second switching station, the method comprising:
   receiving first dual tone multi-frequency (DTMF) digits at the second switching station from a subscriber mobile station;
   establishing a first message queue in response to a interswitch handover request;
   storing the received first DTMF digits in the first message queue;
   sending a first call progress message including at least the first DTMF digits to the first switching station if the handover is successful;
   receiving a DTMF request including second DTMF digits after releasing the first message queue;
   establishing a second message queue and storing the received second DTMF digits therein; and
   creating and sending a second call progress message, including at least the second DTMF digits, to the first switching station.

7. The method of claim 6, further comprising:
   receiving the interswitch handover request from the subscriber mobile station;
   sending a path switch request to the first switching station; and
   receiving a path switch response indicating that the interswitch handover is successful.

8. The method of claim 6, wherein the first call progress message includes a unique tag.

9. The method of claim 8, further comprising:
   receiving a first acknowledgement message including the unique tag from the first switching station; and
   releasing the first message queue.

10. The method of claim 6, further comprising:
    starting a guard timer after sending the first call progress message; and
    releasing the first message queue after the guard timer expires.

11. The method of claim 6, the receiving step receives the DTMF digits at the second switching station directly from the subscriber mobile station.

12. A method for handling input during interswitch handover of a call from a first switching station to a second switching station, the method comprising:

receiving, at the first switching station, a first set of dual-tone multi-frequency (DTMF) digits directly from a subscriber mobile station;

receiving, at the first switching station, a message from the second switching station, the message including a second set of dual-tone multi-frequency (DTMF) digits received by the second switching station directly from the subscriber mobile station;

combining the first and second sets of DTMF digits;

comparing the combined DTMF digits to service triggers in a database; and performing an operation on the first and second sets of DTMF digits associated with at least one of the compared service triggers.

* * * * *